June 2, 1964     J. W. DAVIS     3,135,359
CALIPER TYPE DISC BRAKE
Filed Aug. 28, 1962     4 Sheets-Sheet 3
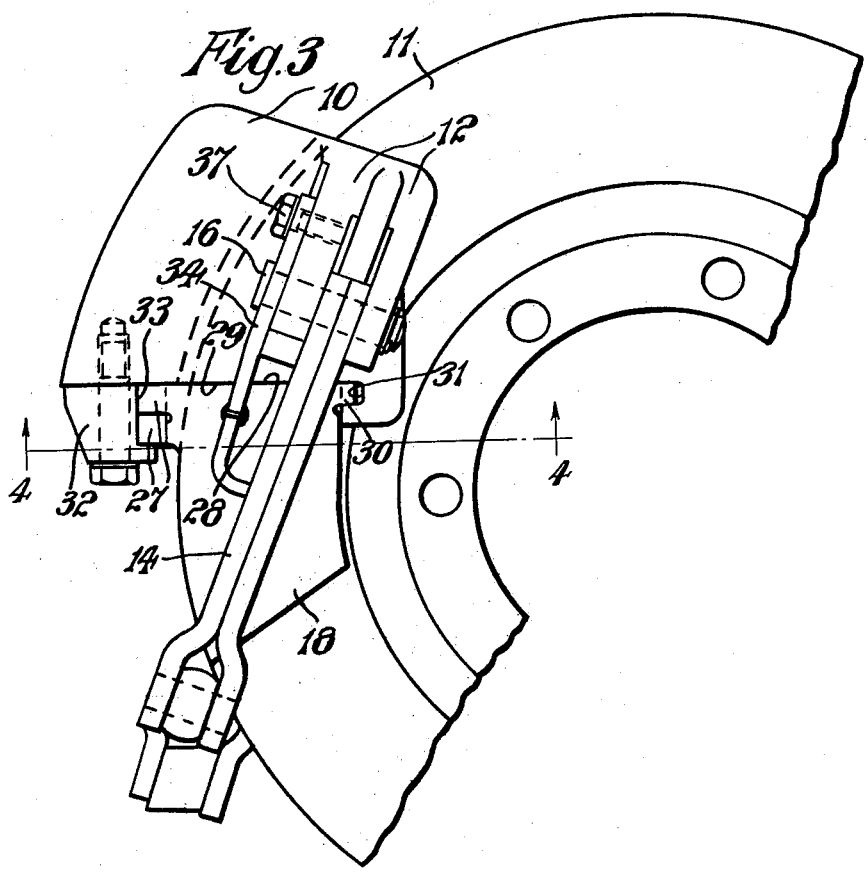
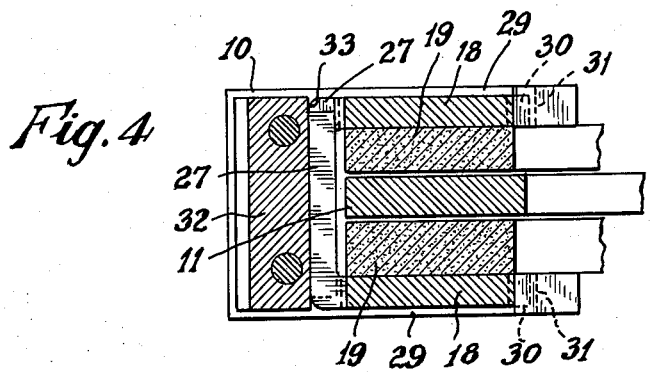
Inventor:
John Walter Davis
by Benj. T. Rauber
attorney United States Patent Office 3,135,359
Patented June 2, 1964

3,135,359
CALIPER TYPE DISC BRAKE
John Walter Davis, Birmingham, England, assignor to Dunlop Rubber Company Limited, London, England, a British company
Filed Aug. 28, 1962, Ser. No. 219,922
Claims priority, application Great Britain Sept. 2, 1961
16 Claims. (Cl. 188—73)

This invention relates to disc brakes and particularly to pads of friction material or friction elements for use therewith.

It has been sugggested that the best shape for a pad of friction material for use in a disc brake from the point of view of wear on the surface of the disc is the so-called segment; i.e. the face of the pad being plane and bounded by a pair of minor arcs of concentric circles and a pair of radii meeting the ends of the arcs. The wear occurring on the braking surface of a disc will be uniform along a radius of the disc if a segmental pad loaded at its centroid is used in the brake.

There are, however, a number of disadvantages in using the segmental pad. They are that the cost of providing a recess to support the pad in a position closely adjacent the surface of the disc is high, there being several machining operations necessary. If a stiff metal backing plate is used to mount the segmental pad in order to facilitate providing a suitable recess and so reduce its cost there is an increased tendency for the brake to squeal. Further, with the segmental pad, since the overall friction forces are acting in a tangential direction at the centroid of the pad there will be a component of force tending to move the pad radially outwardly of the disc. This requires extra structure to restrain the pad from moving under the outward force.

My present invention provides an improved brake pad whereby the above disadvantages are largely overcome.

According to the present invention a disc brake comprises a non-rotatable brake housing having an abutment face to resist circumferential movement of a friction element in the plane of a rotatable disc and means for forcing said element into frictional engagement with said disc, said element having a circumferentially-displaced segmental shape comprising a pair of minor arcs of circles concentric with each other and with said disc and a trailing edge for normal rotation of said disc, to abut said abutment face. Said trailing or abutting edge may be arcuate or straight. When it is straight it is parallel or substantially parallel to a radius of said disc passing through the centroid of said element. When it is arcuate, a tangent to the edge is parallel to said radius. In each case a line through said centroid at right angles, or normal, to said radius is normal to said edge at the point of its intersection of said edge. Accordingly the force created by the drag of the disc on the friction element and transmitted in a tangential direction is normal to the abutting edge and there is no radial component of this force.

By a circumferentially displaced segmental shape is meant the shape produced when one radial end of the segment is cut off and positioned so that the erstwhile radial edges abut.

Preferably said trailing edge is an arc of a circle having the centroid of the friction element as its centre.

A disc brake incorporating the present invention will now be described with reference to the accompanying drawings of which:

FIGURE 3 is a view from the opposite side of the disc from that shown in FIGURE 2;

FIGURE 4 is a section on line 4—4 of FIGURE 3;

Figure 1:
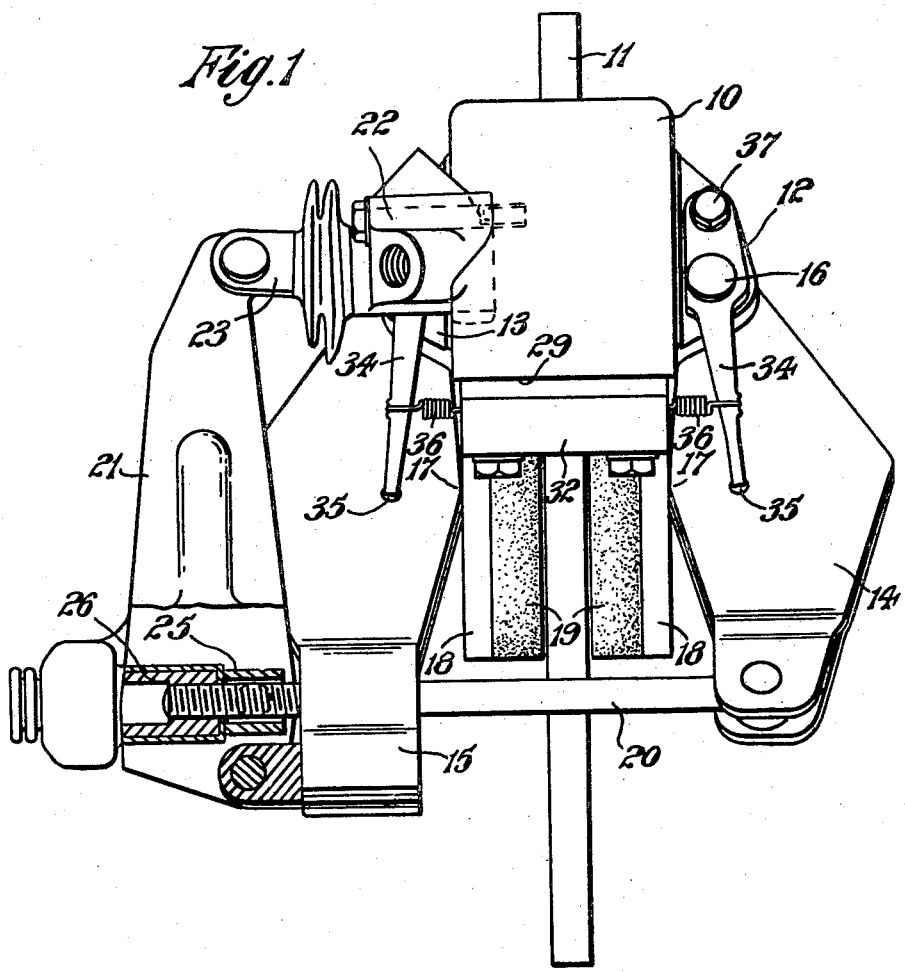
FIGURE 1 is a plan view of a disc brake incorporating a friction element according to the present invention.

A disc brake of my invention has a non-rotatable caliper housing 10 straddling the outer periphery of an annular disc 11 secured to and rotatable with a wheel (not shown) of the vehicle to be braked. Two pairs of lugs 12 and 13 formed integral with the caliper are adapted to have pressure members 14 and 15 pivotably secured thereto by means of pivot pins 16. The lugs 12 and 13 are not positioned axially opposite each other therefore the pressure members 14 and 15 are arranged to extend adjacent the braking surfaces of the disc 11 in directions slightly angled to each other in such a manner that small convex protrusions 17 disposed intermediate the ends of the pressure members are in axial alignment. The protrusions 17 are adapted to bear on the backing plates 18 of friction pads 19 which are guided by the caliper towards and away from the braking surfaces of the disc 11.

A tie rod 20 disposed across the plane of the disc 11 adjacent the outer periphery thereof is pivotably secured to the free end of the pressure member 14. An operating lever 21 is pivoted at the free end of the pressure member 15 so that the planes in which the operating lever 21 and the pressure member 15 are permitted to move are angled slightly with respect to each other. The operating lever 21 extends from its pivot in the general direction of the caliper 10 where a fluid pressure operated piston and cylinder mechanism 22, having the cylinder formed integral with the caliper 10 is adapted by means of a push rod 23 to rotate the operating lever about its pivot.

The tie rod 20 passes through a bifurcated portion of the pressure member 15 adjacent the pivot point of the operating lever 21 and through a trunnion block 25 mounted between the bifurcated arms of the operating lever 21. The free end of the tie rod 20 is threaded and a nut 26 is screwed thereon so that the nut 26 and the trunnion block 25 are in abutment. An automatic adjuster preferably of the type described in my co-pending application Serial No. 219,885, filed August 28, 1962 is mounted on the lever adjacent the nut 26 so that the effective length of the tie rod 20 i.e. the distance between the pivot point of the tie rod and the trunnion block, can be shortened by rotating the nut.

In this type of adjuster a pawl or equivalent is mounted on the operating lever 21 to be rotated by the lever about the axis of the tie rod 20 and, when the wear of the friction elements exceeds a limit, to engage a ratchet tooth on the nut to rotate the nut upon the return movement of the operating lever.

The friction pads 19, which are of circumferentially displaced segmental shape i.e. one radial end of the segment is cut off and positioned so that the erstwhile radial edges abut, are provided with backing plates 18 of the same shape. This general shape is seen more clearly in FIGURE 5 of the accompanying drawings. The backing plates 18 each have a tongue 27 which is bent over at right angles to the backing plate 18 and extends across the periphery of the disc 11. The edges 28 of the friction pads 19 abut a machined face 29 on the caliper 10 and are retained in this position by a projection 30 on the radial inner edge of the backing plate 18 which engages a recess 31 at the inner end of the machined face 29. The tongues 27 projecting from the backing plates 18 are spaced circumferentially of each other so that a keep member 32 bolted to the caliper 10 at the outer end of the machined face 29 forms a slot 33 in which both tongues 27 slidably fit to permit movement of both backing plates 18 and their friction pads 19 in an axial direction.

A pair of springy but deformable retractor fingers 34 extending from the lugs 12, 13 alongside of each pressure member 14, 15 are turned over at their ends to engage in holes 35 in the pressure plates 14, 15. A return spring 36 is positioned in tension between each of the retractor fingers 34 and the backing plates 18 so that the latter moves back from the disc 11 with the pressure members 14, 15. The retractor fingers 34 are rigidly secured to the lugs 12, 13 by the pins 16 and bolts 37 and have sufficient resilience to retract the pressure members 14, 15 sufficiently to lift the friction elements slightly from the surface of the disc after each brake application but are capable of being progressively deformed as wear of the friction pads 19 takes place.

The operating lever 21 may be actuated by mechanical means as well as by or alternatively to the fluid pressure operated piston and cylinder mechanism 22. Movement of the operating lever 21 in a brake applying direction causes the pressure member 15 to press its associated friction pad 19 against the braking surface of the disc 11 and the tie rod 20 draws the pressure member 14 and its associated friction pad 19 towards the opposite braking surface of the disc. As wear of the friction pads 19 occurs the automatic adjuster shortens the effective length of the tie rod to maintain the friction pads 19 at the desired clearance from the braking surface of the disc 11 when the pressure members 14, 15 are in the "brakes off" position.

The wear of the friction pads 19 is kept uniform over the whole surface of their braking face by the interengaging of the two tongues 27 in the slot 33. This prevents twisting of the friction pads which would cause accelerated wear on the leading edge thereof.

The friction pads 19 have a braking surface which has a circumferentially displaced segmental shape such that a radius through the centre of pressure is parallel to the edge 28 which abuts the machined face 29 of the caliper 10.

The advantage of the shape of the friction pads is that they retain the properties of the segmental shaped pad while having the abutment face parallel to a radius passing through the centre of pressure. This causes the drag force to act normal to the abutment and hence no radial component is applied to the pad assembly. Also the centre of pressure is further from the centre of the disc allowing the pressure plates and operating lever to be of shorter length than if a conventional parallel sided shaped pad were used.

A further advantage is that the friction material itself is in contact with the abutment face of the caliper and this provides a measure of damping which tends to eliminate brake squeal.

The invention can be used with disc brakes of a type other than that described above, for instance it could be employed in a disc brake having hydraulic piston and cylinder mechanisms on each side of the disc adapted to force friction pads into contact with the braking surfaces of the disc.

Figure 2:
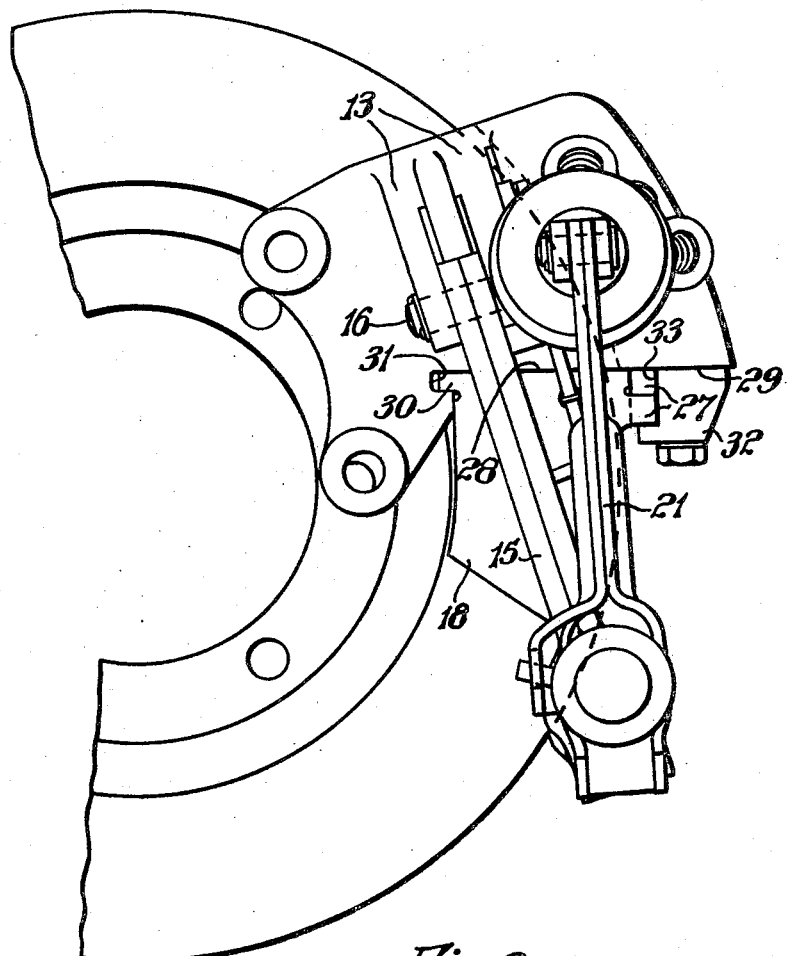
FIGURE 2 is a side view of the disc brake illustrated in FIGURE 1 showing the circumferentially displaced segmental shape friction element.
Figure 5:
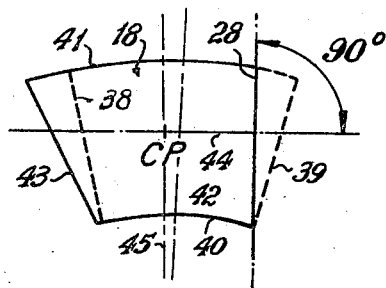
FIGURE 5 illustrates more clearly the general shape of the friction element described with reference of FIGURES 1–3.
Figure 6:
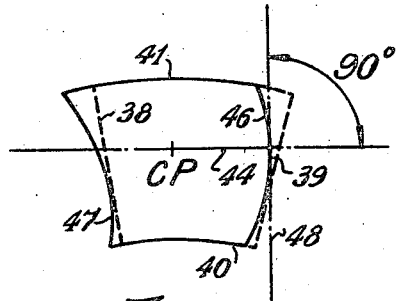
FIGURE 6 and 7 show alternative shapes of friction elements according to the present invention.
Figure 7:
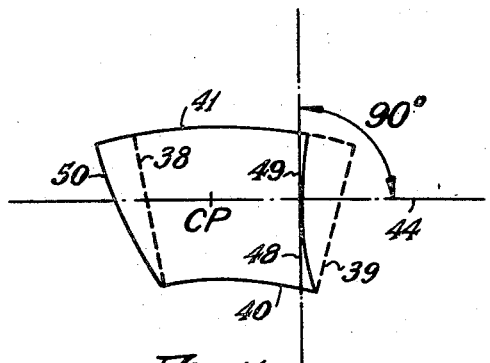

FIGURE 5 of the drawings illustrates the general shape of the friction elements described with reference to FIGURES 1-3 of the accompanying drawings whilst FIGURES 6 and 7 illustrate alternative embodiments in which the abutment edges are arcuate-shaped.

FIGS. 5, 6 and 7 illustrate various outlines of friction elements of circumferentially-displaced segmental shape and the relation of the centroid to the trailing edge of the element. In all figures the centroid is indicated as CP and it is also the center of pressure inasmuch as the center of pressure should coincide with the centroid for an equal distribution of pressure throughout the area of the friction element. In each figure the broken lines 38 and 39 represent the radial sides of a segmental outline which is not circumferentially displaced. The inner and outer arcuate edges of the friction element are shown at 40 and 41, respectively. In FIG. 5, a median line, indicated in dot and dash line 42 of this element divides the outline into two equal halves.

In the embodiment of the friction element shown in FIG. 5, the circumferentially-displaced segment is bounded by the trailing or abutting edge 28, a leading edge 43 and the arcuate inner and outer edges 40 and 41. The edge 28 is normal, that is, at right angles, to a line indicated by the dot and dash line 44 which passes through the centroid and which is normal to a radial line 45 shown in dot and dash from the axis of rotation of the disc, which is coincident with the centers of the arcuate edges 40 and 41, through the centroid. The line 44 is tangent to a circle described on the disc 11 by the rotation of the disc past the centroid CP. The force created by the drag of the disc on the friction element is thus along the line 44 and, as this line is normal to the edge 28 and the edge 29 of the caliper, there is no component of force along the edge 29 and thus no force acting radially on the friction element. This is in contrast to the direction or force acting in approximately the same direction on the edge 39 of the undisplaced segmental outline which would have a radial component along the direction of the edge 39.

Inasmuch as the arc 40 in the embodiment of FIG. 5 is identical for both the undisplaced area and the circumferentially displaced area, the angle subtended by the edges 38, 39 and 43, 28 are equal. The radially outer arcs are equal and accordingly equal angles are subtended. Similarly, all angles subtended by equal radii are equal and constant. Also the increase in arcuate dimensions from the arcuate inner edge to the arcuate outer edge is the same for the circumferentially-displaced and the undisplaced areas and accordingly the wear quality of the elements of the invention is equal to that of an undisplaced segmental element and superior to that of an element having parallel side edges.

In the embodiment of FIG. 6, the straight side edges shown in FIG. 5 are replaced by arcuate edges 46 and 47 in which the trailing or abutment edge 46 is convex and tangent to a line 48 normal to the line 44 of the direction of force at the point where this line intersects the tangent line. Consequently there is no component of force in a radial direction. The area between the line 39 and the edge 46 is equal and coincident with the area between the line 38 and the edge 47 and the same space and angle conditions are maintained as in the embodiment of FIG. 5.

In the embodiment of FIG. 7, the trailing edge 49 is concave to and tangent to the line 48 at the line 44 and accordingly there is no radial component of force in this embodiment. Also the area between the line 39 and the trailing edge 49 is equal and coincident with the area between the line 38 and the leading edge 50. The area and angle conditions of the embodiment of FIG. 5 are maintained.

In the embodiment of FIG. 5, the edge 28 may be machined by a cutter moving in a straight line while the edges 46 of FIG. 6 and 49 of FIG. 7 may be machined by a rotary cutter.

Having now described my invention, what I claim is:

1. A disc brake comprising a rotatable disc, at least one friction element having a surface to engage frictionally a radial surface of a brake disc, said surface of said friction element being of a circumferentially-displaced segmental shape having a trailing edge to abut a stress supporting member, said edge being normal to a line passing through the centroid of said friction element at a right angle to a radial line from the center of said disc to said centroid, said element having a leading edge and radially inner and outer edges, the angle formed by radii of equal length from the center of said disc to said leading and trailing edges being constant, a non-rotatable stress receiving member having an abutting surface complementary to the trailing edge of said friction element and positioned to support the force imposed parallel to said disc by the drag of said disc when said friction element frictionally engages said disc.

2. The disc brake of claim 1 in which said trailing edge is a straight edge parallel to said radial line to said centroid.

3. The disc brake of claim 1 in which said trailing edge is arcuate and in which a tangent to said arcuate edge at said line passing through said centroid is parallel to said radial line to said centroid.

4. The disc brake of claim 3 in which said arcuate edge is concave toward said centroid.

5. The disc brake of claim 4 in which said arcuate edge is centered on said centroid.

6. The disc brake of claim 3 in which said arcuate edge is convex to said centroid.

7. The disc brake of claim 1 in which said friction element comprises a backing plate co-incident with the area of said element.

8. The disc brake of claim 7 in which said backing plate is provided with a projection from its radial inner edge and in which said stress receiving member has a recess receiving said projection.

9. The disc brake of claim 7 in which said brake comprises two friction elements, one on each side of said disc and the backing plate of each friction element is provided with a tongue extending at right angles to the backing plate across the outer periphery of the disc into sliding engagement with the tongue of the opposite friction element and said stress receiving member comprises a keep member having a slot to receive said tongues.

10. The disc brake of claim 9 in which the friction elements are removable in a substantially radial direction when said keep member is removed.

11. A friction element for disc brakes having a surface to engage frictionally a radial surface of a brake disc, said surface of said friction element being of a circumferentially-displaced segmental shape having a trailing edge to abut a stress supporting member, said edge being normal to a line passing through the centroid of said friction element at a right angle to a radial line from the center of said element to said centroid, said element having a leading edge and radially inner and outer edges, the angle formed by radii of equal length from the center of said element to said leading and trailing edges being constant.

12. The friction element of claim 11 in which said trailing edge is a straight edge parallel to said radial line to said centroid.

13. The friction element of claim 11 in which said trailing edge is arcuate and in which a tangent to said arcuate edge at said line to said centroid is parallel to said radial line to said centroid.

14. The friction element of claim 13 in which said arcuate edge is concave toward said centroid.

15. The friction element of claim 14 in which said arcuate edge is centered on said centroid.

16. The friction element of claim 13 in which said arcuate edge is convex toward said centroid.

References Cited in the file of this patent

UNITED STATES PATENTS

| | | |
|---|---|---|
| 2,909,246 | Hodkinson | Oct. 20, 1959 |
| 2,942,695 | Butler | June 28, 1960 |